(12) United States Patent
Zhang et al.

(10) Patent No.: US 8,341,112 B2
(45) Date of Patent: Dec. 25, 2012

(54) ANNOTATION BY SEARCH

(75) Inventors: Lei Zhang, Beijing (CN); Xin-ing Wang, Beijing (CN); Feng Jing, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/419,368

(22) Filed: May 19, 2006

(65) Prior Publication Data

US 2007/0271226 A1    Nov. 22, 2007

(51) Int. Cl.
*G06F 7/00* (2006.01)
(52) U.S. Cl. .......... 707/602; 707/1; 707/2; 707/3; 707/4; 707/5; 707/6; 707/7; 707/100; 713/180
(58) Field of Classification Search .......... 713/180; 707/1–7, 100
See application file for complete search history.

(56) References Cited

U.S. PATENT DOCUMENTS

| | | | |
|---|---|---|---|
| 5,852,823 A | 12/1998 | De Bonet | |
| 5,893,095 A | 4/1999 | Jain et al. | |
| 5,913,205 A | 6/1999 | Jain et al. | |
| 6,128,446 A | 10/2000 | Schrock et al. | |
| 6,397,213 B1 | 5/2002 | Cullen et al. | |
| 6,480,841 B1 | 11/2002 | Higashio et al. | |
| 6,804,659 B1 | 10/2004 | Graham et al. | |
| 6,804,684 B2 | 10/2004 | Stubler et al. | |
| 6,970,860 B1 | 11/2005 | Liu et al. | |
| 7,010,751 B2 | 3/2006 | Shneiderman | |
| 7,624,337 B2 | 11/2009 | Sull et al. | |
| 7,739,304 B2 | 6/2010 | Naaman et al. | |
| 7,961,986 B1 | 6/2011 | Jing et al. | |
| 7,971,150 B2 | 6/2011 | Raskutti et al. | |
| 2002/0038299 A1 | 3/2002 | Zernik et al. | |
| 2002/0087538 A1* | 7/2002 | Abdel-Mottaleb et al. | 707/6 |
| 2002/0184196 A1 | 12/2002 | Lehmeier et al. | |
| 2002/0188602 A1* | 12/2002 | Stubler et al. | 707/3 |
| 2003/0018631 A1 | 1/2003 | Lipson et al. | |
| 2003/0195883 A1* | 10/2003 | Mojsilovic et al. | 707/6 |
| 2004/0003351 A1 | 1/2004 | Sommerer et al. | |
| 2004/0021780 A1 | 2/2004 | Kogan | |
| 2004/0070678 A1 | 4/2004 | Toyama et al. | |
| 2004/0213553 A1 | 10/2004 | Nagahashi | |
| 2004/0225686 A1* | 11/2004 | Li et al. | 707/104.1 |
| 2005/0010602 A1* | 1/2005 | Loui et al. | 707/104.1 |

(Continued)

FOREIGN PATENT DOCUMENTS

EP        1304625        4/2003

(Continued)

OTHER PUBLICATIONS

Lieberman et al., "Aria: an agent for annotating and retrieving images", pp. 1-6, http://www.bubblemountain.com/images/Aria-IEEE.pdf, 2001.*

(Continued)

*Primary Examiner* — Jeffrey Pwu
*Assistant Examiner* — Hee Song
(74) *Attorney, Agent, or Firm* — Lee & Hayes, PLLC (57) ABSTRACT

Annotation by search is described. In one aspect, a data store is searched for images that are semantically related to a baseline annotation of a given image and visually similar to the given image. The given image is then annotated with common concepts of annotations associated with at least a subset of the semantically and visually related images.

16 Claims, 3 Drawing Sheets

U.S. PATENT DOCUMENTS

| | | | |
|---|---|---|---|
| 2005/0114325 | A1 | 5/2005 | Liu et al. |
| 2005/0210393 | A1 | 9/2005 | Maeng |
| 2005/0278379 | A1 | 12/2005 | Nakazawa |
| 2006/0143176 | A1* | 6/2006 | Mojsilovic et al. ............ 707/6 |
| 2006/0179453 | A1 | 8/2006 | Kadie et al. |
| 2006/0264209 | A1 | 11/2006 | Atkinson et al. |
| 2007/0005571 | A1 | 1/2007 | Brewer et al. |
| 2007/0038601 | A1* | 2/2007 | Guha ............................. 707/3 |
| 2007/0106685 | A1 | 5/2007 | Houh et al. |
| 2007/0112844 | A1 | 5/2007 | Tribble et al. |
| 2007/0160275 | A1* | 7/2007 | Sathyanarayana ......... 382/128 |
| 2007/0240060 | A1 | 10/2007 | Berenbach et al. |
| 2007/0255618 | A1 | 11/2007 | Meerbergen et al. |
| 2007/0266001 | A1 | 11/2007 | Williams et al. |
| 2007/0271226 | A1 | 11/2007 | Zhang et al. |
| 2007/0288453 | A1 | 12/2007 | Podilchuk |
| 2008/0004953 | A1 | 1/2008 | Ma et al. |
| 2008/0235724 | A1 | 9/2008 | Sassenscheidt et al. |
| 2008/0319844 | A1 | 12/2008 | Hua et al. |
| 2009/0187825 | A1 | 7/2009 | Sandquist et al. |
| 2009/0196510 | A1 | 8/2009 | Gokturk et al. |
| 2009/0249185 | A1 | 10/2009 | Datar et al. |
| 2009/0300475 | A1 | 12/2009 | Fink et al. |
| 2009/0313239 | A1 | 12/2009 | Wen et al. |
| 2009/0319883 | A1 | 12/2009 | Mei et al. |
| 2010/0057694 | A1 | 3/2010 | Kunjithapatham et al. |
| 2010/0076923 | A1 | 3/2010 | Hua et al. |
| 2010/0076968 | A1 | 3/2010 | Boyns et al. |
| 2010/0205202 | A1 | 8/2010 | Yang et al. |
| 2010/0293174 | A1 | 11/2010 | Bennett et al. |
| 2011/0173141 | A1 | 7/2011 | Campbell et al. |

FOREIGN PATENT DOCUMENTS

| | | |
|---|---|---|
| JP | 1196176 | 4/1999 |
| JP | 2003186889 | 7/2003 |
| JP | 2004234228 | 8/2004 |
| JP | 2005011079 | 1/2005 |
| JP | 2005352782 | 12/2005 |
| KR | 20040054901 | 6/2004 |
| RU | 2193797 | 11/2002 |
| WO | WO2005008519 | 1/2005 |
| WO | WO2006002745 | 1/2006 |

OTHER PUBLICATIONS

Cheng et al., "Effective Image Annotation for Search Using Multi-level Semantics", pp. 230-242, Springer-Verlag Berlin Heidelberg 2003.*

Monga et al., "Clustering Algorithms for Perceptual Image Hashing", pp. 283-287, 2004 IEEE 11th Digital Signal Processing Workshop & IEEE Signal Processing Education Workshop,2004.*

Liu et al., "Robust Photo Retrieval Using World Semantics", pp. 1-6, http://web.media.mit.edu/~lieber/Publications/LREC.pdf., 2002.*

Lu et al., "A Unified Framework for Semantics and Feature Based Relevance Feedback in Image Retrieval Systems", pp. 31-37. ACM Multimedia, 2001.*

Ono et al., "A Flexible Content-Based Image Rerieval System with Combined Scene Description Keyword", pp. 201-208, IEEE Proceedings of Multimedia'96, 2006.*

Qiu et al., "Compressing histogram representations for automatic color photo categorization", pp. 2177-2193, vol. 37, Issue 11, Pattern Recognition Society, Elsevier. 2003.*

Liao et al., "LiveImage: Organizing Web Images by Relevant Concept", In Proc. of the Workshop on the Science of the Artificial (Hualien, Taiwan, Dec. 205), 210-220.*

Badi, "Recognition and Representation of User Interest", Master Thesis, Texas A&M University, Dec. 2005, 72 pgs.

Chen, et al., "PVA: A Self-Adaptive Personal View Agent", Kluwer Academic Publishers, Journal of Intelligent Information Systems, Mar. 2002, pp. 173-194.

Crandall, et al., "Mapping the World's Photos", WWW Conference Committee, Madrid, Spain, Apr. 20-24, 2009, 10 pgs.

Evans, et al., "Adaptive Multimedia Access: From User Needs to Semantic Personalisation", retrieved on Sep. 18, 2009 at http://nets.ii.uam.es/~acemedia/publications/iscas06.pdf, IEEE International Symposium on Circuits and Systems, ISCAS 2006, Kos, Greece, May 21-24, 2006, 4 pgs.

Grcar, et al., "User Profiling for Interest-Focused Browsing History", Oct. 2005, retrieved on Sep. 18, 2009 at http://eprints.pascal-network.org/archive/00001202/01/GrcarBrowsingHistorySiKDD2005.pdf, 4 pgs.

Gunduz, et al., "A User Interest Model for Web Page Navigation", In Proceedings of International Workshop on Data Mining for Actionable Knowledge (DMAK), Seoul, Korea, Apr. 2003, pp. 46-57.

Keyword Tool, retrieved on Sep. 18, 2009 at https://adwords.google.com/select/KeywordToolExternal, 1 pg.

Cheng et al., "Auto-Generation of Topic Hierarchies for Web Images from Users' Perspectives", Proc 12th Intl Conf on Information and Knowledge Management, Nov. 2003, available at http://portal.acm.org/citation.cfm?id=956969, 4 pgs.

Huang, et al., "Image Indexing Using Color Correlograms", Proc 1997 Conf on Computer Vision and Pattern Recognition (CVPR'97), Jun. 1997, 7 pages.

Jeon, et al., "Automatic Image Annotation and Retrieval Using Cross-Media Relevance Models", Proc 26th Annual Intl ACM SIGIR Conf on Research and Development in Information Retrieval, Jul. and Aug. 2003, available at http://ciir.cs.umass.edu/pubfiles/mm-41.pdf, 8 pgs.

Jeon, et al., "Using Maximum Entropy for Automatic Image Annotation", 3rd Intl Conf Image and Video Retrieval, CIVR Jul. 2004, Proceedings Series: Lecture Notes in Computer Science, 3115, available at http://ciir.cs.umass.edu/pubfiles/mm-355.pdf, 9 pgs.

Pan, et al., "Automatic Image Captioning", IEEE Intl Conf on Multimedia and Expo, Jun. 2004, available at http://www.informedia.cs.cmu.edu.documents/ICME04AutoICap.pdf, 4 pgs.

Wang, et al., "AnnoSearch: Image Auto-Annotation by Search", Proc 2006 IEEE Computer Society Conf on Computer Vision and Pattern Recognition, Mar. 2006, , 8 pgs.

Wang, et al., "Image Annotation Using Search and Mining Technologies", Proc 15th Intl Conf on World Wide Web, May 2006, 2 pages.

Wang, et al., "Large-Scale Duplicate Detection for Web Image Search", 2006 IEEE Intl Conf on Multimedia and Expo, Jul. 2006, 4 pages.

"Web Search & Mining Group" retrieved Feb. 27, 2006 at http://www.research.microsoft.com/wsm, 5 pgs.

Wenyin, et al., "Semi-Automatic Image Annotation", Proc of Interact 2001, 8th IFIP TC.13 Conf on Human Computer Interaction, Jul. 2001, 8 pgs.

Zeng, et al., "Learning to Cluster Web Search Results", Proc 27th Annual Intl ACM SIGIR Conf on Reseach and Development in Information Retrieval, Jul. 2004, pp. 210-217.

Mei, et al., "Contextual In-Image Advertising", retrieved on Oct. 27, 2009 at <<http://www.cs.clemson.edu/~jzwang/0901863/mm2008/p439-mei.pdf>>, MM 2008, ACM, Oct. 2008, pp. 439-448.

Wang, et al., "Argo: Intelligent Advertising by Mining a User's Interest from His Photo Collections", retrieved on Oct. 27, 2009 at <<http://research.microsoft.com/en-us/people/xjwang/argo_wangyuzhang_.pdf>>, ADKDD 2009, ACM, Jun. 2009, 9 pages.

Barnard, et al., "Matching Words and Pictures", retrieved on Apr. 16, 2010 at <<http://www.cs.princeton.edu/~blei/papers/Barnard-DuyguluFreitasForsythBleiJordan2003.pdf>>, JMLR.org, Journal of Machine Learning Research, vol. 3, Mar. 2003, pp. 1107-1135.

Broder, A. et al., "A Semantic Approach to Contextual Advertising", SIGIR, pp. 559-566, 2007.

Carneiro, et al., "Supervised Learning of Semantic Classes for Image Annotation and Retrieval", retrieved on Apr. 16, 2010 at <<http://citeseerx.ist.psu.edu/viewdoc/download?doi=10.1.1.88.3490&rep=rep1&type=pdf>>, IEEE Computer Society, Transactions on Pattern Analysis and Machine Intelligence, vol. 29, No. 3, Mar. 2007, pp. 394-410.

Chen, et al, "Advertising Keywork Suggesiton Based on Concept Hierarchy", In Poc. of ACM WSD, 2008, 20 pages.

Deng, et al., "ImageNet: A Large-Scale Hierarchical Image Database", retrieved on Apr. 16, 2010 at <<http://wordnet.cs.princeton.edu/papers/imagenet_cvpr09.pdf>>, Proceedings of the IEEE Conference on Computer Vision and Pattern Recognition (CVPR), 2009, pp. 1-8.

Fellbaum (ed.), "WordNet: An Electronic Lexical Database", retrieved on Apr. 16, 2010 at <<http://www.dsoergel.com/cv/C19.pdf>>, MIT Press, Cambridge, MA, May 1998, 7 pages.

Foo, et al., "Detection of Near-duplicate Images for Web Search", retrieved on Apr. 16, 2010 at <<http://www.cs.rmit.edu.au/~jufoo/pdfs/CIVR07_Foo.pdf>>, ACM, Proceedings of the 6th International Conference on Image and Video Retrieval (CIVR), Amsterdam, The Netherlands, Feb. 2007, pp. 557-564.

Gelasca, et al., "CORTINA: Searching a 10 Million + Images Database", retrieved on Apr. 16, 2010 at <<http://vision.ece.ucsb.edu/publications/elisa_VLDB_2007.pdf>>, VLDB Endowment, Proceedings of Conference on Very Large Data Bases (VLDB), Vienna, Austria, vol. 7, Sep. 2007, pp. 2-5.

Griffin, et al., "Caltech-256 Object Category Dataset", retrieved on Apr. 16, 2010 at <<http://authors.library.caltech.edu/7694/1/CNS-TR-2007-001.pdf>>, Caltech Technical Report 7694, 2007, pp. 1-20.

Hays, et al., "Scene Completion Using Millions of Photographs", retrieved on Apr. 16, 2010 at <<http://delivery.acm.org/10.1145/1280000/1276382/a4-hays.pdf?key1=1276382&key2=4013141721&coll=GUIDE&dl=GUIDE&CFID=84511483&CFTOKEN=74352152>>, ACM, Transactions on Graphics, vol. 26, No. 3, Article 4, Jul. 2007, pp. 1-8.

Hua, et al. "When Multimedia Advertising Meets the New Internet Era", Int'l Workshop on Multimedia Signal Processing, pp. 1-5, 2008.

Jaspers et al., "CANDELA—Storage, Analysis and Retrieval of Video Content in Distributed Systems", retrived at <<http://vca.ele.tue.nl/publications/data/jaspers2005a.pdf>>, on Apr. 17, 2010.

Jing, et al., "Learning Region Weighting from Relevance Feedback in Image Retrieval" In Proc. of IEEE Int. Cong. on Acoustics Speech and Signal, 2002, 4 pages.

Joshi, et al. "Keyword Generation for Search Engine Advertising" In Proc. of the 6th IEEE Int. Cong. on Data Mining—Workshops, Dec. 2006, 24 pages.

Ke, et al., "PCA-SIFT: A More Distinctive Representation for Local Image Descriptors", retrieved on Apr. 16, 2010 at <<http://www.cs.cmu.edu/~rahuls/pub/cvpr2004-keypoint-rahuls.pdf>>, IEEE Computer Society, Conference on Computer Vision and Pattern Recognition (CVPR), vol. 2, Jun. 2004, pp. 1-8.

Kim, H.R. et al., "Learning Implicit User Interest Hierarchy for Context in Personalization.", In Proc. of International Conference on Intellegent User Interface, 2003, 8 pages.

Lacera A. et al., "Learning to Advertise", SIGIR, pp. 549-556, 2006.

Letizia, L.H. "An Agent that Assists Web Browsing." In Proc. of the International Joint Conference on Aritficial Intellegence, Montreal, CA, 1995, 6 pages.

Li, et al., "Delivering Online Adversitisements Inside Images," In Proc. of ACM Multimedia, Cancouver, Canada, Oct. 2008. 10 pages.

Li, et al., "Image Annotation by Large-Scale Content-based Image Retrieval", retrieved on Apr. 16, 2010 at <<http://doi.acm.org/10.1145/1180639.1180764>>, ACM, Proceedings of the 14th Annual International Conference on Multimedia, Santa Barbara, CA, Oct. 2006, pp. 607-610.

Li, et al., "Searching One Billion Web Images by Content: Challenges and Opportunities", retrieved on Apr. 16, 2010 at <<http://research.microsoft.com/en-us/um/people/leizhang/paper/mcam07-li.pdf>>, Springer-Verlag Berlin, Proceedings of International Workshop on Multimedia Content Analysis and Mining (MCAM), Weihai, China, Jul. 2007, pp. 33-36.

Li, et al. "Tag-Based Social Interest Discovery." WWW, pp. 675-684. 2008. 10 pages.

Lin et al., "Video Collaborative Annotation Forum: Establishing Ground-Truth Labels on Large Multimedia Datasets", IBM T.J. Watson research Center, 2003, pp. 1-19.

Ma, et al., "Interest-Based Personalized Search", ACM Trans. on Information Systems, vol. 25(1), 2007, 38 pages.

Middleton, et al., "Capturing Knowledge of User Preferences: Ontologies in Recommender Systems." In Proc. of the 1st International Congerence on Knowledge Capture (K-Cap2001), Victoria, BC, Canada, 2001, 8 pages.

Moxley, et al., "Automatic Video Annotation through Search and Mining", retrieved on Apr. 16, 2010 at <<http://ieeexplore.ieee.org/stamp/stamp.jsp?tp=&arnumber=4607527, IEEE Conference on Multimedia and Expo (ICME), Hannover, Germany, Jun. 2008, pp. 685-688.

Murdock, et al., "A Noisy-Channel Approach to Contextual Advertising." ADKDD, pp. 21-28, 2007.

"ODP—The Open Directory Project", retrieved on Apr. 16, 2010 at <<http://dmoz.org/>>, 2010, pp. 1.

Plangprasopchok, et al. "Constructing Folksonomies from User-Specified Relations on Flickr." WWW, 2009, 10 pages.

Ribeiro-Neto, et al., "Impedance Coupling in Con-tent-targeted Advertising." SIGIR, pp. 496-503, 2005, 8 pages.

Torralba, et al., "80 million tiny images: a large dataset for non-parametric object and scene recognition", retrieved on Apr. 16, 2010 at <<http://people.csail.mit.edu/torralba/publications/80millionImages.pdf>>, IEEE Computer Society, Transactions on Pattern Analysis and Machine Intelligence, vol. 30, No. 11, Nov. 2008, pp. 1958-1970.

Tseng et al., "Video Summarization and Personalization for Pervasive Mobile Devices", IBM T.J. Watson Research Center, 2002, pp. 1-12.

VTT,"MobiCon—Integrated Capture, Annotation and Sharing of Video Clips with Mobile Phones", retrvied at <<http://www.vtt.fi/files/services/ipr/mobicon_integrated_capture.pdf >> on Apr. 17, 2010.

Wang, et al., "Advertising Based on Users' Photos", retrieved on Apr. 16, 2010 at <<http://ieeexplore.ieee.org/stamp/stamp.jsp?tp=&arnumber=5202834>>, IEEE International Conference on Multimedia and Expo (ICME), New York, NY, 2009, pp. 1640-1643.

Wang, et al. "Annotating Images by Mining Image Search Results", I-PAMI, vol. 30(11), pp. 1919-1932, 2008.

Wang, et al., "Content-Based Image Annotation Refinement", retrieved on Apr. 16, 2010 at <<http://research.microsoft.com/en-us/um/people/leizhang/paper/cvpr07-changhu.pdf>>, IEEE Conference on Computer Vision and Pattern Recognition (CVPR), Jun. 2007, pp. 1-8.

Wordtracker, http://www.wordtracker.com, Feb. 22, 2010.

Yamamoto et al., "iVAS: Web-based Video Annotation System and its Applications", retrived at <<http://iswc2004.semanticweb.org/demos/29/paper.pdf>> on Apr. 17, 2010, pp. 1-4.

Zhang, et al., "EnjoyPhoto—A Vertical Image Search Engine for Enjoying High-Quality Photos", retrieved on Apr. 16, 2010 at <<http://research.microsoft.com/en-us/um/people/leizhang/paper/acmmm06-enjoyphoto.pdf>>, ACM, Proceedings of the 14th Annual International Conference on Multimedia (MM), Santa Barbara, California, Oct. 2006, pp. 367-376.

Zhou, et al. "Utilizing Search Intent in Topic Ontology-based User Profile for Web Mining." In Proc. of IEEE Int. Conf. on Web Intellegence, 2006, 4 pages.

Batra, et al., "Cutout-Search: Putting a Name to the Picture", retrieved on Aug. 2, 2010 at <<http://chenlab.ece.cornell.edu/people/adarsh/publications/cvpr_iv_2009.pdf>>, IEEE Computer Society, Proceedings of Workshop on Computer Vision and Pattern Recognition (CVPR), Miami, Florida, Jun. 2009, pp. 23-30.

"Become an Online Image Detective with TinEye (groovyReview)", retrieved on Aug. 3, 2010 at <<http://www.groovypost.com/howto/groovyreview/become-online-image-detective-tineye-review/>>, groovyPost.com, Jan. 18 2010, pp. 1-11.

bing.com, Maps, Retrieved on Dec. 28, 2009 at <<http://cn.bing.com/ditu/>>, 2 pgs.

Cai, et al., "Hierarchical Clustering of WWW Image Search Results Using Visual, Textual and Link Information", retrieved on May 26, 2010 at <<http://citeseerx.ist.psu.edu/viewdoc/download?doi=10.1.1.72.455&rep=rep1&type=pdf>>, ACM, Proceedings of International Conference on Multimedia (MM), New York, NY, Oct. 2004, pp. 952-959.

Chang, Lin, "LIBSVM: a Library for Support Vector Machines", retrieved on Apr. 12, 2010 at <<http:// http://www.csie.ntu.edu.tw/~cjlin/papers/libsvm.pdf>>, National Taiwan University Technical Report, Computer Science and Information Engineering, 2001-2004, pp. 1-30.(software available at http://www.csie.ntu.edu.tw/~cjlin/libsvm).

Classification and Retrieval of Images—Published Date: Sep. 17, 2010 http://claret.wikidot.com/ 3 pages.

Deschacht, et al., "Text Analysis for Automatic Image Annotation", retrieved on Aug. 2, 2010 at <<http://class.inrialpes.fr/pub/106-deschacht-acl07.pdf>>, Meeting of the Association for Computational Linguistics, Prague, Jun. 2007, pp. 1-8.

Fergus et al., "A Visual Category Filter for Google Images," Computer Vision—\ ECCV, 2004, Lecture Notes in Computer Science, 2004, vol. 3021/2004, 14 pages.

"Google Sets", retrieved on Dec. 15, 2008 at <<http://labs.google.com/sets>>, Google, 1 page.

Hua, et al. "Internet Multimedia Search and Mining"—Published date: Jan. 27, 2010 http://research.microsoft.com/en-us/um/people/xshua/imsm/ebook/pdf/16.pdf, 30 pages.

Jing, et al., "VisualRank: Applying PageRank to Large-Scale Image Search", retrieved on May 26, 2010 at <<http://www.cc.gatech.edu/home/yjing/pami_camera_ready.pdf>>, IEEE Computer Society, Transactions on Pattern Analysis and Machine Intelligence, vol. 30, No. 11, Nov. 2008, pp. 1-14.

Jones, "Windows Live Photo and Video Blog", retrieved on Aug. 3, 2010 at <<http://blogs.msdn.com/b/pix/archive/2008/09/17/next-version-of-windows-live.aspx>>, Sep. 17, 2008, pp. 1.

Li, J., "Automatic Linguistic Indexing of Pictures by a Statistical Modeling Approach" IEEE Transactions on Pattern Analysis and Machine Intelligence, 25(9):1075-1088, 2003.

Lowe, "Distinctive Image Features from Scale-Invariant Keypoints", retrieved on Jul. 30, 2010 at <<http://citeseerx.ist.psu.edu/viewdoc/download?doi=10.1.1.157.3843&rep=rep1&type=pdf>>, Kluwer Academic Publishers, Hingham, MA, vol. 60, No. 2, International Journal of Computer Vision, 2004, pp. 91-110.

Miller, "Wordnet: an on-line lexical database" International Journal of Lexicography, pp. 39-41, 1990.

Monaghan, et al., "Automating Photo Annotation using Services and Ontologies", retrieved on Aug. 2, 2010 at <<http://ieeexplore.ieee.org/stamp/stamp.jsp?arnumber=01630615>>, IEEE Computer Society, Proceedings of International Conference on Mobile Data Management (MDM), 2006, pp. 1-4.

Noah, et al. "Binding Semantic to a Sketch Based Query Specification Tool"—Published Date: Apr. 2009 http://www.ccis2k.org/iajit/PDF/vol.6,no.2/2BSSBQST116.pdf, 8 pages.

Nowak, et al., "Sampling strategies for bag-of-features image classification," (c) Springer-Verlag Berlin Heidelberg 2006, ECCV 2006, retrieved at <<http://lear.inrialpes.fr/people/nowak/dwl/eccv06.pdf>>, 14 pages.

Osman, et al., "Semantic Annotation and Retrieval of Image Collections", retrieved on Aug. 2, 2010 at <<http://www.scs-europe.net/conf/ecms2007/ecms2007-cd/ecms2007/ecms2007%20pdf/vv_0167.pdf>>, Proceedings European Conference on Modelling and Simulation (ECMS), 2007, pp. 1-6.

Picasa 3, retrived at http://picasa.google.com/ on Aug. 4, 2009, 1 pg.

Satoh, et al., "Name-It: Naming and Detecting Faces in News Videos", retrieved on Aug. 2, 2010 at <<http://www.informedia.cs.cmu.edu/documents/nameit_IEEE-MM99.pdf>>, IEEE Computer Society, Multimedia, vol. 6, No. 1, 1999, pp. 22-35.

Strong, et al., "Organizing and Browsing Image Search Results based on Conceptual and Visual Similarities" Retrieved Date: Jan. 5, 2011 http://www.cs.mun.ca/~hoeber/download/2010_isvc_vibe_concept.pdf, 10 pages.

Trajkova, et al., "Improving Ontology-Based User Profiles." In Proc. of RIAO, pp. 380-389, 2004.

Wang, et al., "ARISTA—Image Search to Annotation on Billions of Web Photos", retrieved on Feb. 8, 2010 at <<http://research.microsoft.com/en-us/people/xjwang/cvpr10_paper301_arista_final.pdf>>, IEEE Computer Society, Proceedings of Conference on Computer Vision and Pattern Recognition (CVPR), San Francisco, California, Jun. 2010, pp. 1-8.

Wnuk, et al. "Filtering Internet Image Search Results Towards Keyword Based Category Recognition" Retrieved Date: Jan. 5, 2011 http://vision.ucla.edu/papers/wnukS08.pdf, 8 pages.

Yang, et al., "A Comparative Study on Feature Selection in Text Categorization", Proceedings of the Fourteenth International Conference on Machine Learning, 1997, pp. 412-420 (9 pgs.).

The Russian Office Action mailed Mar. 25, 2011 for Russian Patent Application No. 2008145584, a counterpart foreign application of U.S. Appl. No. 11/419,368.

Translated the Chinese Office Action mailed Jul. 6, 2011 for Chinese patent application No. 200780017842.6, a counterpart foreign application of U.S. Appl. No. 11/419,368.

Office Action for U.S. Appl. No. 12/563,955, mailed on Oct. 13, 2011, Xin-Jing Wang, "Interest Learning from an Image Collection for Advertising", 21 pgs.

The Chinese Office Action mailed Mar. 20, 2012 for Chinese patent application No. 200780017842.6, a counterpart foreign application of U.S. Appl. No. 11/419,368, 8 pages.

Office Action for U.S. Appl. No. 12/563,955, mailed on Mar. 15, 2012, Xin-Jing Wang, "Interest Learning from an Image Collection for Advertising", 23 pgs.

Office Action for U.S. Appl. No. 12/790,761, mailed on Mar. 20, 2012, Motaz Ahmed El-Saban, "Real-Time Annotation and Enrichment of Captured Video", 15 pgs.

Yeh, et al., "Searching the Web with Mobile Images for Location Recognition", IEEE, 2004, pp. 6.

PCT Search Report Patent Application No. PCT/US2007/012193 Mailed on Dec. 12, 2007, pp. 5.

Japanese Office Action mailed May 25, 2012 for Japanese patent application No. 2009-511113, a counterpart foreign application of U.S. Appl. No. 11/419,368, 8 pages.

Office Action for U.S. Appl. No. 12/790,772, mailed on May 24, 2012, Wang et al., "Associating Media With Metadata of Near-Duplicates", 12 pages.

* cited by examiner

ANNOTATION BY SEARCH

BACKGROUND

A traditional approach to annotate digital images is to manually annotate each digital image with one or more semantically related keywords. Such keywords are often used to facilitate keyword-based image search and retrieval operations in computer-based search environments (e.g., across computing devices, databases, the Internet, etc.). Because of the very large number of digital images that generally exist in such search environments, manual annotation of digital images to facilitate image search and retrieval operations represents a very labor intensive and time consuming task.

SUMMARY

Annotation by search is described. In one aspect, a data store is searched for images that are semantically related to a baseline annotation of a given image and visually similar to the given image. The given image is then annotated with common concepts of annotations associated with at least a subset of the semantically and visually related images.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Systems and methods for annotation by search are described. The systems and methods perform a keyword-based search of local and/or remote database(s) to locate digital images that are semantically related to a baseline annotation of given image. The systems and methods measure visual similarity of each of the semantically related images to the given image. These visual similarity measurements are used to select images that are more relevant in visual space to the given image than other ones of the semantically related images. These selected images are similar in text and visual space to the given image. Candidate complementary annotations associated with the selected images are extracted from respective contexts of the selected images. The extracted annotations are clustered. Each cluster includes annotations with common or related concept(s). For example, a cluster of annotations associated with an image of a bee on a rose may contain annotations related to a bee, a rose, etc.). The systems and methods rank saliency of the concepts using one or more scoring criteria to identify a set of top-ranked concepts. The systems and methods annotate the given image with at least a subset of the information provided by the top-ranked concepts.

These and other aspects of systems and methods for annotation by search are now described in greater detail.

An Exemplary System

Although not required, systems and methods for annotation by search are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
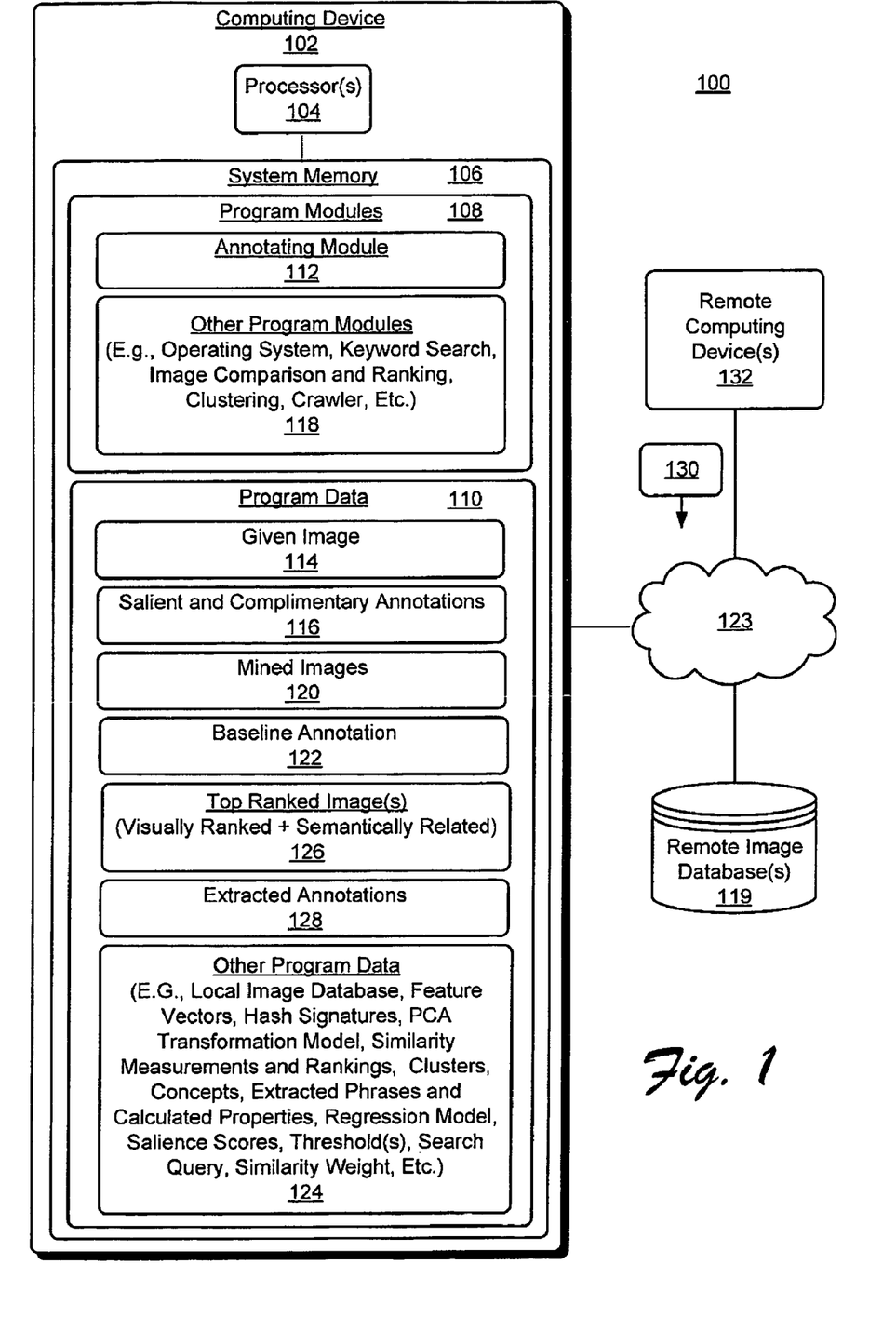
FIG. 1 shows an exemplary system for annotation by search, according to one embodiment.

FIG. 1 shows an exemplary system 100 for annotating images, according to one embodiment. System 100 includes, for example, a computing device 102. Computing device 102 represents any type of computing device such as a general purpose computing device, a server, a laptop, a mobile computing device, etc. Computing device 102 includes one or more processors 104 coupled to system memory 106. The system memory 106 includes volatile memory (e.g., RAM) and non-volatile memory (e.g., ROM, Flash, hard disk, optical, etc.). System memory 106 includes computer-program modules 108 and program data 110. Processor(s) 104 fetch and execute computer-program instructions from respective ones of the program modules 108. Program modules 108 include, for example, annotating module 112 to automatically annotate a given image 114 with salient and complimentary annotations 116 of unlimited vocabulary. Program modules 108 also includes, for example, other program modules 118 such as an operating system to provide a runtime environment, a keyword-based search application, an image comparison and ranking application, a text/document clustering application, a web crawler application, and/or so on.

To identify salient and complimentary annotations 116, annotating module 112 performs a standard keyword-based search of remote databases(s) 119 and/or local database(s) to locate a set of digital images (i.e., mined images 120) that are semantically related to a baseline annotation 122 of given image 114. In one implementation, baseline annotation 122 represents a location, an event name, a folder name, a description, etc. associated with given image 114, text surrounding given image 114 on a web page, text associated with other images in relationship (e.g., on a same web page, in a same folder, etc.) with given image 114, query input received from a user, and/or so on. The local and/or remote databases represent any type of data store for digital images. For example, the data store(s) can be one or more of a CD, floppy disk and/or on any other removable storage medium, a hard disk, etc. For purposes of exemplary illustration, local database(s) are shown as a respective portion of "other program data" 124. In one implementation, the local and/or remote databases were populated with annotated digital images by a crawler program module, uploaded by individuals, and/or so on. In this implementation, remote database 119 is shown coupled to computing device 102 over network 123. Network 123 may include any combination of a local area network (LAN) and a general wide area network (WAN) communication environments, such as those which are commonplace in offices, enterprise-wide computer networks, intranets, and the Internet.

Visual Similarity Measurement

The described keyword-based search operations return mined images 120 that are semantically related to baseline annotation 122. However, vocabularies used by content authors can vary greatly, and most words in natural language have inherent ambiguity. As a result, keywords are not always good descriptors of relevant document contents. Such ambiguity often results in keyword-based search keyword/document term mismatch problems. Because keywords representing annotations can be ambiguous, annotating module 112 further evaluates mined images 120 to identity image(s) that are also at least conceptually related in visual space to given image 114 (the identified image(s) could also be duplicates and/or substantially visually similar to given image 114). More particularly, annotating module 112 compares visual features of mined images 120 to visual features of given image 114 to generate visual similarity measurements (i.e., rankings) to identify images that are related not only in text space (i.e., semantically related), but also in visual space to given image 114. (The visual similarity measurements are shown as a respective portion of "other program data" 124). There are many known techniques to compare visual similarity between digital images.

In this implementation, for example, annotating module 112 encodes visual features of given image 114 and mined images 120 to generate respective hash signatures for each digital image as follows. In this implementation, annotating module 112 creates respective feature vectors for given image 114 and each mined image 120 using well-known N-bin (e.g., a 36 bin) color correlogram-based operations. Other known techniques, besides those based on a color correlogram, can also be used to generate the feature vectors. Annotating module 112 multiplies the generated feature vectors with a PCA transformation model generated from a large number of digital images (e.g., millions of images) for subsequent quantization into binary bits for comparison. For example, if an element of a feature vector is larger than a mean of the largest eigenvector associated with the PCA transformation model, annotating module 112 quantizes (encodes) the element to 1, otherwise the element is encoded to 0. These binary encodings represent the respective hash signatures.

Annotating module 112 uses the hash signature of each mined image 120 and the hash signature of given image 114 to measure a visual similarity between each mined image 120 and given image 114. Annotating module 120 can use one or more known techniques to measure such visual similarity. For example, annotating module 112 can implement one or more of multiple techniques of digital image visual space distance measurement such as hash code de-duplication plus Euclidean distance, hash code distance, weighted hash code distance, or other techniques can be used to measure visual similarity. In one implementation, for example, annotating module 112 uses hash code de-duplication plus Euclidean distance to measure visual similarity between a mined image 120 and given image 114. In this example, annotating module 112 utilizes the higher n bits fragments of the hash signature of given image 114 as an index to measure visual similarity. (Higher bits correspond to larger eigenvalues, which means larger distance in visual space). Annotating module 112 calculates Euclidean distance based on correlograms associated with the semantically related images.

In another example, annotating module 112 uses hash code distance to measure visual similarity between a mined image 120 and given image 114. For instance, in one implementation annotating model 112 utilizes the Hamming distance to measure the number of different bits between two respective images and determine an image similarity measure. With respect to using weighted hash code distance, and because higher bits are generally considered to be more significant than lower bits, annotating module 112 provides the difference between higher bits (associated with the images being compared) with more weight than the difference between lower bits. Annotating module 112 evenly separates the hash signatures into bins (e.g., 32-bit hash codes into 8 bins), and weights the i-th bin by $2^{8-i}$, $1 \leq i \leq 8$. This equation can be modified to tune it to the best results. For example, if the number of bins is not equal to eight, the equation is tuned to represent the number of bins being used. In this manner, the visual distance (ranking) between a first image and a second image is the weighted Hamming distance.

Annotating module 112 identifies N top-ranked images 126 from mined images 120 based on the visual similarity measurements between respective ones of the mined images 120 and given image 114. In this implementation, parameter N is configurable based on the particular implementation of system 100. For example, in one implementation, N is equal to 2000, although N could also be a different value.

Exemplary Annotation Prediction

Annotating module 112 retrieves or extracts other annotations associated with top-ranked image(s) 126. These other annotations are shown as extracted annotation(s) 128. These other annotations are retrieved by annotation module (or from a different program module such as a web crawling module) from context(s) of the top-ranked image(s) 126 in their respective locations in local and/or remote databases. Such contexts include, for example, a title of a resource (a top-ranked image 126), a name of a directory folder associated with the resource, a description of the resource, text in association with the resource on a web page or in a document, text associated with other images in relationship (e.g., on a same web page, in a same folder, document, etc.) with the resource, a Universal Resource Identifier (URI) specifying a location of the resource, a category of the resource, and/or so on.

Annotating module 112 clusters extracted annotations 128 (i.e., treats each of the extracted annotations 128 as a respective document) to identify top-ranked concepts (e.g., words and/or phrases) of extracted annotations 128. For purposes of exemplary illustration, such clusters and concepts are shown as respective portions of "other program data" 124. In one implementation, for example, annotating module 112 identifies these concepts by implementing (or otherwise accessing from "other program modules" 118) clustering operations such as those described in "Learning to Cluster Web Search Results", Zeng, H. J., He, Q. C., Chen, Z., and Ma, W.-Y, 27th Annual International Conference on Research and Development in Information Retrieval, Sheffield, United Kingdom, (July 2004), pp. 210-217, although different clustering techniques could also be used. The clustering operations generate a number of clusters, each cluster being assigned a respective common concept (or salient phrase).

To obtain a common concept for each cluster (a cluster name), clustering operations extract phrases (n-grams) from extracted annotations 128, and calculate one or more properties for each extracted phrase (e.g., phrase frequencies, document frequencies (i.e., phrase-to-annotation frequencies), etc.). The clustering operations apply a preconfigured regression model to combine the calculated properties into a single salience score for each cluster. Using the salience scores, the clustering operations use the top-ranked phrases as the common concepts (names) of candidate clusters. These candidate clusters are further merged according to their corresponding documents (i.e., associated digital images) to assign a final salience score to each cluster.

In this implementation, and for each cluster, a threshold is used to merge (filter) candidate top ranked images 126 for the cluster (other techniques can also be used to merge images with respective clusters). The threshold is equal to an image similarity weight*an average visual similarity score. In this implementation, the similarity weight is selected from a range of 0.8~1.6 based on the specific clustering operation implementation, although other ranges could be used as well. For example, in this implementation the similarity weight is equal to 1.2 (when the similarity weight is equal to 1.6 not enough images were used for clustering, whereas when the similarity weight was set to 0.08, nearly all images were used for clustering). The average image visual similarity score is equal to the SUM of the visual similarity of image i to the given image 114) (i.e., output by the above described keyword and visual filtering operations) divided by the number of mined images 120.

A cluster's final salience score can be determined using various criteria. For example, final salience scores of clusters can be determined using maximum cluster size criterion, average member image score criterion, etc. With respect to maximum cluster size criterion, which is Maximum a Posteriori estimation (MAP), this criterion assumes that common concepts with the greatest saliency to given image 114 are phrases of dominant concepts of cluster member images. Thus, according to this technique, the final saliency score of a cluster is equal to the number of its member images. In this implementation, for example, maximum cluster size criterion is utilized and the largest 3 clusters (and associated cluster names) are selected.

With respect to using average member image score criterion to assign salience scores to clusters, this technique uses an average of member image similarity as the score of a cluster. If all images in a cluster are the most relevant to baseline annotation 122, the common concept of this cluster will likely represent that of given image 114. To this end, a threshold (or other criteria) is used as a gap to determine if lower-ranked clusters are to be omitted from the final set of clusters. In this implementation, the threshold is set according to the following: 0.95*(score of the cluster which ranked i−1), wherein i represents a ranking of a current cluster. If the score of the current cluster (i.e. the cluster which ranked i) is less than this threshold, the current cluster and all the other lower ranging clusters are not used. If more than a particular number of clusters (e.g., 3 or some other number of clusters) exceed this threshold, only the top ranked particular number (e.g., 3 or some other number) of clusters are used to identify the final extracted concepts.

In this implementation, annotating module 112 generates salient and complimentary annotations 116 by removing duplicate keywords, terms, etc., from the common concepts (cluster names) associated with clusters having final salience scores (rankings) that exceed the threshold. Annotating module 112 annotates given image 114 with salient and complimentary annotations 116.

An Exemplary Procedure

Figure 2:
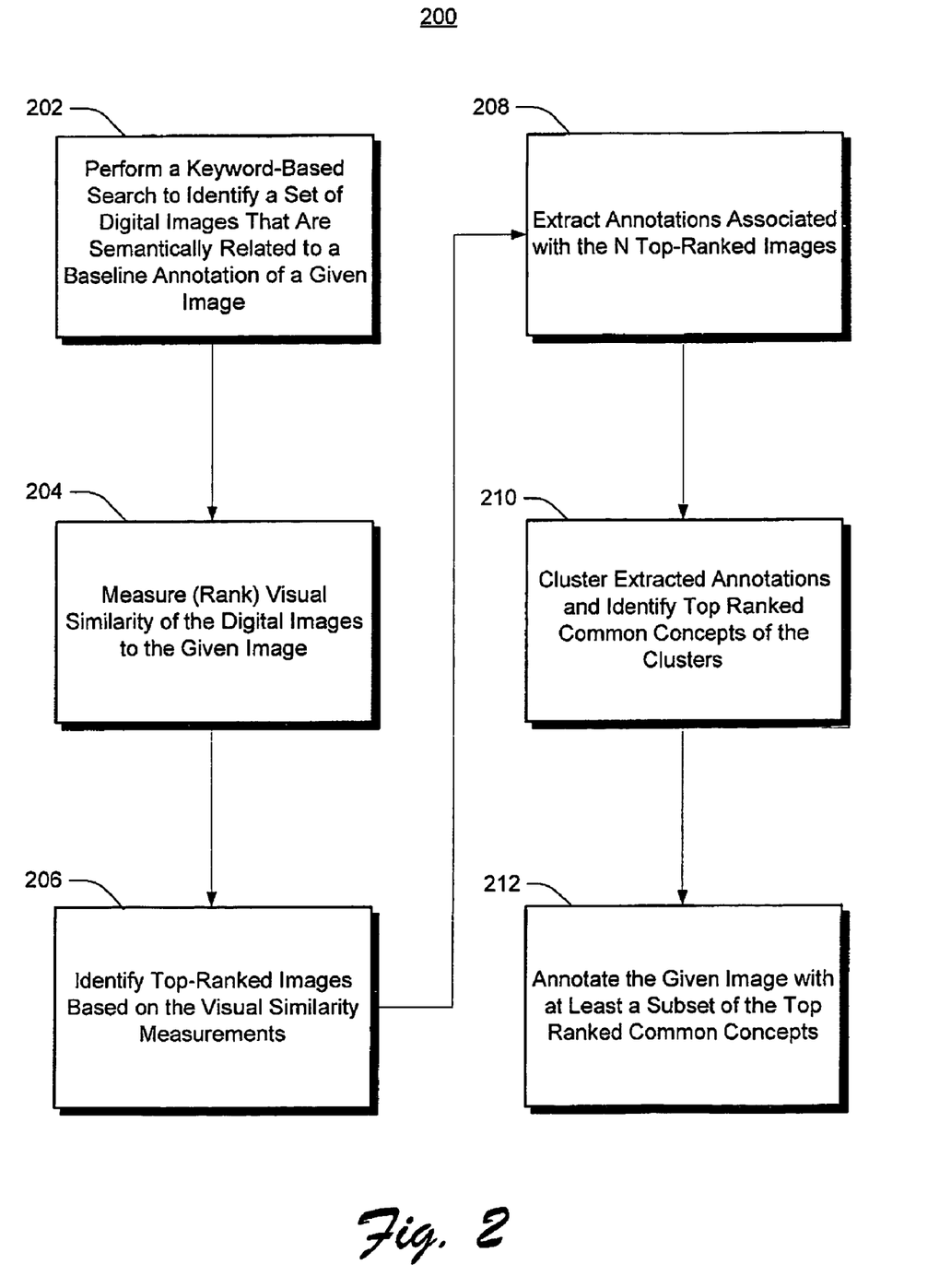
FIG. 2 shows an exemplary procedure for annotation by search, according to one embodiment.

FIG. 2 shows an exemplary procedure 200 for annotation by search, according to one embodiment. For purposes of exemplary illustration and description, the operations of procedure 200 are described with respect to components of FIG. 1. At block 202, a set of digital images (i.e., mined images 120) that are semantically related to a baseline annotation 122 of a given image 114 are identified. As one example, annotating module 112 performs a keyword-based search of local and/or remote database(s) to locate a set of digital images (i.e., mined images 120) that are semantically related to a baseline annotation 122 of given image 114. In one implementation, given image 114 and baseline annotation 122 represent a search query (shown in "other program data" 124) from a user of computing device 102. A user can enter commands and information into computer 102 via input devices (not shown) such as keyboard, pointing device, voice recognition, etc. In another implementation, given image 114 and baseline annotation 122 represent a search query 130 from a user of remote computing device 132, which is coupled to computing device 102 over network 123. For example, a user of remote computing device 130

At block 204, visual similarity of each of mined image 120 to given image 114 is measured (ranked). In one implementation, for example, annotating module 112 measures visual similarity of each mined image 120 to given image 114. There are multiple possible techniques to measure visual similarity between each mined image 120 to given image 114. Such techniques include, for example, hash code de-duplication plus Euclidean distance, hash code distance, weighted hash code distance, etc.

At block 206, top-ranked images 126 from mined images 120 that are most visually similar to given image 114 are identified (derived). In one example, annotating module 112 identifies top-ranked images 126 from mined images 120 based on the visual similarity measurements (i.e., the visual similarity rankings) between respective ones of the mined images 120 and given image 114. In this implementation, the number of top ranked images 126 is configurable based on the particular implementation of system 100. At block 208, other annotations (i.e., extracted annotation(s) 128) associated with top-ranked image(s) 126 are extracted from contexts of top ranked images 126. Such contexts include, for example, a title of a resource (a top-ranked image 126), a name of a directory folder associated with the resource, a description of the resource, text in association with the resource on a web page or in a document, text associated with other images in relationship (e.g., on a same web page, in a same folder, document, etc.) with the resource, a Universal Resource Identifier (URI) specifying a location of the resource, a category of the resource, and/or so on. In one example, annotating module 112 retrieves or extracts other annotations (i.e., extracted annotation(s) 128) associated with top-ranked image(s) 126.

At block 210, extracted annotations 128 are clustered to identify top-ranked common concepts (e.g., words and/or phrases that comprise salient and complementary annotations 116) from extracted annotations 128. These top ranked common concepts are shown as salient and complimentary annotations 116. In one implementation, annotating module 112 clusters extracted annotations 128 to identify salient and complimentary annotations 116. At block 212, given image 114 is annotated (supplemented) with at least a subset of salient and complimentary annotations 116. For example, in one implementation, duplicate keywords, terms, etc. are removed from salient and complimentary annotations 116 prior to annotating given image 114 with salient and complimentary annotations 116. In one implementation, annotating module 112 annotates given image 114 with at least a subset of salient and complimentary annotations 116.

Figure 3:
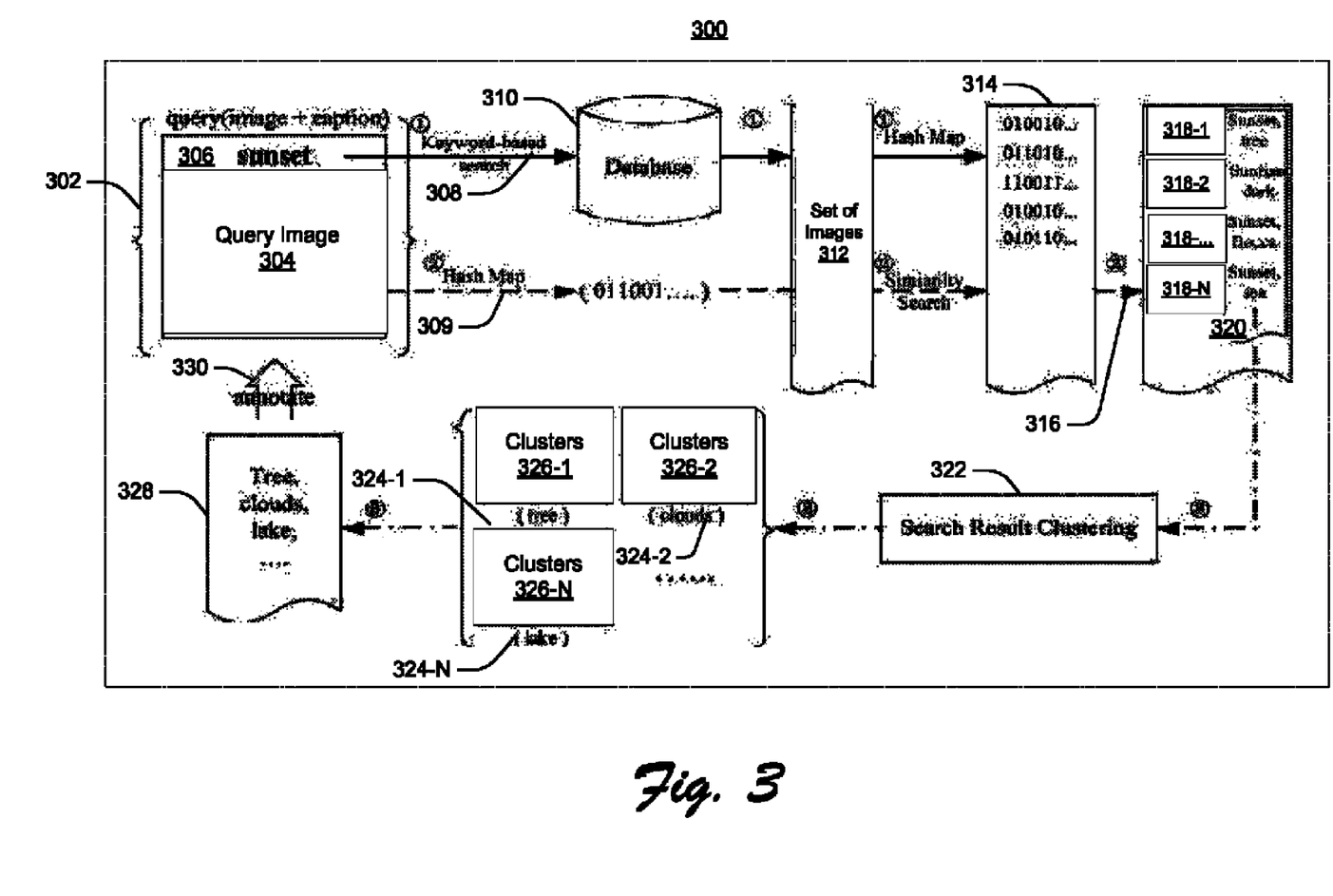
FIG. 3 shows an exemplary data and process flow for annotation by search, according to one embodiment.

FIG. 3 shows exemplary framework 300 of data and process flow for annotation by search of system 100, according to one embodiment. For purposes of exemplary description and reference, aspects of framework 300 are described with respect to components and/or operations of FIGS. 1 and 2. In the description, the leftmost numeral of a reference number indicates the first figure in which the component or operation is presented.

Referring to the FIG. 3, framework 300 shows three stages for annotation by search, including a keyword-based search stage (shown by numerals (1)), a visual feature search stage (shown by numerals (2)), and an annotation clustering, or learning stage (shown by numerals (3)). Data 302 represents a query associated with an image 304 (i.e., given image 114)

and a caption 306 (i.e., baseline annotation 122). In one implementation, the query 302 is a search query received from a user of computing device 102 or remote computing device 132 (e.g., please see query 130 of FIG. 1). In this example, query image 304 is a landscape including at least a lake, clouds, and trees. It can be appreciated, that query image 304 can represent any type of image. In this example, caption 306 indicates the word "sunset" to annotate query image 304.

Operation 308, using caption 306 ("sunset"), performs a keyword-based search of database 310 to identify a set of images 312 (i.e., mined images 120) that are semantically related to the query image. Database 310 represents any combination of local and/or remote image databases of system 100 of FIG. 1. Data flow of information associated with caption 306 is shown in FIG. 3 with solid lines. Operation 309 generates respective hash maps/signatures 314 for each of query image 304 and semantically related images 312 for subsequent similarity search operations. Data flow of information associated with given image 114 is shown in FIG. 3 with dashed lines.

Operation 316 ranks (i.e., measures) visual similarity of semantically related images 312 to query image 304 by using the respective hash signature 314 of each image 312 and the hash signature 314 of query image 304. There are various techniques to measure this visual similarity (or distance) with hash signatures 314. Such techniques include, for example, hash code de-duplication plus Euclidean distance, hash code distance, weighted hash code distance, etc. Framework 300 uses the visual similarity rankings to select a configurable number of images 312 that are more visually similar to query image 304 that other ones of the images 312. These more visually similar images 312 are shown as top-ranked images 318 (318-1 through 318-N). Top-ranked images 318 represent top ranked images 126 of FIG. 1.

Framework 300 extracts annotations from contexts associated with top-ranked images 318. As discussed above, such contexts include, for example, a title of an image 318, a name of a directory folder associated with an image 318, a description of an image 318, text in association with an image 318 on a web page or in a document, text associated with other images in relationship (e.g., on a same web page, in a same folder, document, etc.) with an image 318, a Universal Resource Identifier (URI) specifying a location of an image 318, a category of an image 318, and/or so on. These extracted annotations are shown as extracted annotations 320 (i.e., extracted annotations 128 of FIG. 1). Data flow associated with extracted annotations 320 is shown with dashed and dotted lines associated with stage (3).

At block 322, framework 300 performs search result clustering (i.e., grouping) operations to identify top-ranked common concepts (e.g., complementary annotations 324-1 through 324-N) from clusters (e.g., clusters 326-1 through 326-N) of extracted annotations 320. In this implementation, these common concepts are determined using operations described in "Learning to Cluster Web Search Results", Zeng, H. J., He, Q. C., Chen, Z., and Ma, W.-Y, 27th Annual International Conference on Research and Development in Information Retrieval, Sheffield, United Kingdom, (July 2004), pp. 210-217, although different clustering techniques could also be used.

Although each cluster 326 is illustrated with a respective set of images and an underlying common concept 324, clusters 326 do not contain images. Instead each cluster 326 includes certain ones of extracted annotations 320. This illustration of images in a cluster is merely symbolic to show the relationship of each common concept 324 to each top-ranked image 318 associated with one or more respective ones of the extracted annotations 320. Framework 300 removes duplicate keywords, terms, and/or so on, from common concepts 324 to generate complementary annotations 328. Complementary annotations 328 represent salient and complementary annotations 116 of FIG. 1. At operations 330, framework 300 annotates query image 304 with complementary annotations 328.

In one implementation, the described operations of framework 300 are performed by a respective program module 10 of FIG. 1. For example, in one implementation, annotating module 112 implements the operations of framework 300.

CONCLUSION

Although systems and methods for annotation by search have been described in language specific to structural features and/or methodological operations or actions, it is understood that the implementations defined in the appended claims are not necessarily limited to the specific features or actions described above. For example, although system 100 has been described as first identifying semantically related images and then determining visual similarity of the semantically related images to generate top-ranked images 126, in another implementation, system 100 generates top-ranked images 126 using only one of: (a) the described keyword search operations; or (b) a search of local and/or remote databases for visually similar images. When top-ranked images 126 are generated from only visually similar images, given image 114 may be entered as a query image independent of baseline annotation 122. In another example, in one implementation computing device 102 provides an annotation by search service to remote computing devices 132 over network 123. In view of the above, the specific features and operations of system 100 are disclosed as exemplary forms of implementing the claimed subject matter.

The invention claimed is:

1. A memory storing computer program instructions executable by a processor, the computer program instructions including instructions for performing operations comprising:
    searching one or more data stores for images that are semantically related to a baseline annotation of a given image and visually similar to the given image;
    measuring visual similarity of the semantically related images to the given image, wherein at least a subset of the images are selected from certain ones of the images determined to be more visually similar to the given image than other ones of the images;
    calculating properties for phrases extracted from respective ones of annotations associated with the at least a subset of the images, the annotations being grouped into a respective cluster of multiple clusters;
    combining, for each cluster, associated ones of the properties to generate a salience score for the cluster, wherein common concepts are associated with one or more clusters having higher salience scores as compared to salience scores associated with other ones of the clusters; and
    annotating the given image with common concepts of annotations associated with at least a subset of the images that are both semantically related and visually similar to the given image.

2. The memory of claim 1, wherein the computer-program instructions further comprise instructions for removing duplicate-terms from the common concepts prior to annotating the given image.

3. The memory of claim 1, wherein the computer-program instructions further comprise instructions for receiving a search query comprising the given image and the baseline annotation.

4. The memory of claim 1, wherein the computer program instructions further comprise instructions for:
retrieving the images that are semantically related from the one or more data stores being searched; and
determining a common concept of annotations based at least on one or more weighted clusters of annotations associated with at least a subset of the images being retrieved, wherein the annotating includes annotating the given image with the common concept of annotations.

5. A computer-implemented method comprising:
searching for a first set of images that are semantically related to a baseline annotation of a given image;
evaluating each image in the first set of images to identify a second set of images that are at least conceptually related in visual space to the given image;
identifying annotations associated with the second set of images;
determining concepts common across respective ones of the annotations wherein determining concepts comprises:
clustering the annotations into a plurality of clusters such that each cluster of the clusters is associated with a salient concept of the cluster;
determining salience scores for the each salient concept of multiple salient concepts associated with the clusters;
selecting a set of top ranked salience concepts from the multiple salient concepts based on respective ones of the salience scores, wherein at least a subset of the top ranked salience concepts are the complimentary annotations; and
annotating the given image with at least a subset of the concepts as complimentary annotations.

6. The method of claim 5, further comprising receiving input comprising the given image and the baseline annotation.

7. The method of claim 5, wherein the searching further comprises correlating the baseline annotation with texts associated with the first set of images.

8. The method of claim 5, wherein the evaluating further comprises comparing hash signature encoded visual features of the given image with respective hash signature encoded visual features of each image in the first set of images.

9. The method of claim 5, wherein the evaluating further comprises:
measuring visual similarity of each image in the first set of images to the given image;
identifying, based on visual similarity measurements determined in the measuring, a set of top ranked images that are more visually related to the given image than other images from the first set of images; and
wherein the second set of images are the top ranked images.

10. The method of claim 5, wherein identifying annotations further comprises extracting text from contexts of the second set of images.

11. A computing device comprising:
a processor; and
a memory coupled to the processor, the memory comprising computer-program instructions that, when executed by the processor, perform operations of:
receiving a search query comprising a given image and a baseline annotation of the given image;
searching for a first set of images that are semantically related to the baseline annotation of the given image;
evaluating each image in the first set of images to identify a second set of images that are visually related to the given image, wherein the second set of images comprise certain images determined to be more visually related to the given image than other ones of the images;
calculating properties for phrases extracted from respective ones of the annotations, the annotations being grouped into a respective cluster of multiple clusters;
combining, for each cluster, associated ones of the properties to generate a salience score for the cluster, wherein common concepts are associated with one or more clusters having higher salience scores as compared to salience scores associated with other ones of the clusters; and
supplementing the given image with additional annotations associated with the second set of images, each image in the first second set of images being visually similar to the given image and associated with annotations that are semantically related to the baseline annotation, wherein the additional annotations are selected from image annotations and not from using a predetermined list.

12. The computing device of claim 11, wherein the additional annotations represent one or more of a title, a description, a category, information from a web page, a folder name, at least a portion of a Uniform Resource Identifier, and text in association with a different image that is not in the first set of images.

13. The computing device of claim 11, wherein the computer-program instructions further comprise instructions for deriving the first set of images by mining the images from one or more image databases, each image in the first set of images being mined based on text associated with the given image.

14. The computing device of claim 11, wherein the computer-program instructions further comprise instructions for:
performing a keyword based search to locate the first set of images that are semantically related to the baseline annotation;
searching the first set of images for one or more images that have substantial visual similarity to the given image;
extracting text from one or more contexts of the one or more images that have substantial visual similarity to the given image; and
wherein the text comprises at least additional annotations.

15. The computing device of claim 14, wherein the computer-program instructions further comprise instructions for:
identifying phrases in the text;
assigning salience scores to the phrases based on respective phrase properties; and
wherein the additional annotations comprise at least a portion of the text with higher salience scores as compared to salience scores associated with other portions of the text.

16. The computing device of claim 15, wherein the respective phrase properties comprise one or more of phrase frequencies and phrase-to-annotation frequencies.

* * * * *